Patented May 15, 1951

2,553,055

UNITED STATES PATENT OFFICE 2,553,055

SYNTHESIS OF 5-(SEC.-BUTYL) HYDANTOIN

John E. Livak, Clemson, S. C., and Edgar C. Britton, Midland, Mich., assignors to The Dow Chemical Company, Midland, Mich., a corporation of Delaware No Drawing. Application November 7, 1946, Serial No. 708,467

3 Claims. (Cl. 260—309.5)

This invention concerns a new method for the synthesis of isoleucine and salts thereof.

Although several methods for the synthesis of isoleucine are known, the known methods are time-consuming, inconvenient to carry out, or result in poor yields of isoleucine. For instance, the method given on page 60 of volume 21 of "Organic Synthesis," published in 1941 by John Wiley and Sons of N. Y., involves formation of diethyl sec.-butylmalonate from diethyl malonate and sec.-butyl bromide, hydrolysis of the diethyl sec.-butylmalonate and subsequent bromination to form bromomalonic acid, and ammonolysis of the latter followed by a series of evaporation and crystallization operations to separate the isoleucine product. The time required to carry out this series of reactions is greater than one week. The yield of crystalline isoleucine in the final ammonolysis and purification steps is given as 49 per cent of theoretical. From the yields given for earlier steps of the process, it is evident that the overall yield of isoleucine from the process as a whole is about 28 per cent.

It is an object of this invention to provide a new method for the synthesis of isoleucine which permits production of the compound quite rapidly, conveniently and in good yield from a readily obtainable starting material. Other objects will be apparent from the following description of the invention.

The method of this invention comprises reducing tiglic aldehyde to form alpha-methyl-butyraldehyde, reacting the alpha-methyl-butyraldehyde with a water-soluble inorganic cyanide and ammonium carbonate to form 5-(sec.-butyl) hydantoin, hydrolyzing the latter to form isoleucine and separating the product. Each reaction is of a known general type and previously known procedures for carrying out these types of reactions may be applied. However, the combination of reactions involved in the synthesis is new. Also, we have discovered improved procedures for carrying out each individual reaction and for isolating and purifying the isoleucine product which may be applied with advantage.

The tiglic aldehyde may be reduced in ways previously known, e. g. by treatment with iron powder and acetic acid, but such known reduction procedure results in formation of alpha-methyl-butyraldehyde in low yield and impure form. We have found that the reduction can be accomplished very rapidly to produce alpha-methyl-butyraldehyde in excellent yield by a direct catalytic hydrogenation procedure. The tiglic aldehyde either in undiluted form, or diluted with an organic solvent such as methyl alcohol, ethyl alcohol, propyl alcohol, isopropyl alcohol, butyl alcohol, or ethylene glycol, etc., is treated with a minor amount, e. g. from 1 to 10 per cent, of an active hydrogenation catalyst. As the catalyst, powdered palladium has proven most satisfactory, but other catalysts such as platinum black, nickel, etc., can be used.

The mixture thus formed is contacted with hydrogen under pressure until at least 0.7, and preferably about 1, molecular equivalent of hydrogen has been consumed per mole of the aldehyde. The reaction is advantageously carried out at an absolute pressure of from 3 to 6 atmospheres and at temperatures below 50° C., preferably at from room temperature to 40° C., but it may be accomplished at lower or higher pressures or temperatures. The extent of the reaction may be determined from the decrease in pressure of the hydrogen on the mixture. When using palladium as a catalyst and carrying the hydrogenation out at the temperatures and pressures just recommended, the reaction ceases, or becomes sluggish, when conversion of the tiglic aldehyde to alpha-methyl-butyraldehyde is substantially complete.

After completing the hydrogenation reaction, the pressure is released and the catalyst is removed from the mixture, e. g. by filtration or decantation. The alpha-methyl-butyraldehyde, or solution thereof, resulting from the hydrogenation reaction is admixed with an aqueous solution of an ionizable inorganic cyanide and ammonium carbonate. As the cyanide reactant, an alkali metal cyanide, such as sodium or potassium cyanide, is preferred, but other water-soluble inorganic cyanides, such as calcium cyanide or ammonium cyanide, may be used. In some instances it may be desirable to purify the alpha-methyl-butyraldehyde, e. g. by distillation, prior to admixture with the cyanide and ammonium carbonate solution, but this usually is not necessary.

The inorganic cyanide and ammonium carbonate reactants are usually employed in amounts corresponding approximately to those theoretically required for reaction with the alpha-methyl-butyraldehyde to form 5-(sec.-butyl) hydantoin, but they may be used in smaller or in considerably larger proportions, if desired. The relative proportions of the several reactants theoretically required in such reaction between an alkali metal cyanide, ammonium carbonate and alpha-methyl-butyraldehyde are one molecular equivalent of the cyanide and three chemical equivalents, i. e. 1.5 molecular equivalents, of ammonium carbonate per mole of the aldehyde. When a cyanide of calcium, or other metal capable of forming an insoluble carbonate, is used as a starting material, the proportion of ammonium carbonate theoretically required is correspondingly larger due to the fact that a portion of the ammonium carbonate is consumed in forming such insoluble metal carbonate. Because of this fact, an alkali cyanide is preferably used in the reaction.

We have found that instead of using ammonium carbonate as the only ammonium salt reactant, other inorganic ammonium salts such as ammonium chloride, ammonium bromide, ammonium sulphate, or ammonium acetate, etc., may advantageously be used either in addition to, or in place of a portion of, the ammonium carbonate, provided at least one molecular equivalent of the latter is used per mole of the aldehyde. For instance, an aqueous mixture of one molecular equivalent of alpha-methylbutyraldehyde, one mole of ammonium carbonate and one mole of ammonium chloride may be used with advantage in producing the 5-(sec.-butyl) hydantoin. Such use of a reaction mixture containing ammonium carbonate together with another ammonium salt results in formation of the 5-(sec.-butyl) hydantoin in higher yield than when the reaction is carried out under otherwise similar conditions using ammonium carbonate as the only ammonium salt starting material. The reaction mixture preferably contains water in amount sufficient to dissolve the reactants.

The reaction to form 5-(sec.-butyl) hydantoin is accomplished by heating such aqueous mixture to a reaction temperature, e. g., of between 40° and 120° C., and preferably from 60° to 90° C., at atmospheric or superatmospheric pressure. The time required for completion of the reaction varies from about 20 minutes to several hours depending on the temperature employed, the rate of reaction being greater, of course, at the higher temperatures within the range just mentioned.

The mixture is then acidified, preferably by adding a mineral acid such a hydrochloric or sulphuric acid in amount sufficient to bring the mixture to a pH value below 4, and the mixture is cooled to precipitate the 5-(sec.-butyl) hydantoin product. During acidification of the mixture care should be taken not to inhale the vapors, since hydrogen cyanide frequently is evolved, e. g. the acidification may be accomplished in a well-ventilated hood. The precipitated product is removed, e. g. by filtration, and washed free of mother liquor.

A further amount of 5-(sec.-butyl) hydantoin can be recovered either by direct extraction from the mother liquor or by evaporating the mother liquor substantially to dryness, preferably under vacuum, and extracting 5-(sec.-butyl) hydantoin from the residue with an organic solvent, e. g. acetone. The 5-(sec.-butyl) hydantoin in the extract is recovered in crystalline form by evaporation of the solvent. If necessary, it may be purified by washing the same with water or alcohol.

The 5-(sec.-butyl) hydantoin may be hydrolyzed by any of the procedures conventionally employed in hydrolyzing hydantoins to form corresponding alpha-amino monocarboxylic acids. However, we have found that the hydrolysis may be accomplished most conveniently to form isoleucine, or a salt thereof, in exceptionally high yield by employing aqueous barium hydroxide as the hydrolyzing agent and carrying the reaction out under pressure in a bomb or autoclave at temperatures between 115° and 210° C. Approximately 1.5 molecular equivalents or more of barium hydroxide are preferably employed per mole of the 5-(sec.-butyl) hydantoin to be hydrolyzed and water is usually present in amount exceeding that required to dissolve the barium hydroxide, but it may be present in smaller proportion, e. g. the barium hydroxide may be employed as an aqueous slurry thereof. It is desirable, but not essential, that the hydrolysis be accomplished in the substantial absence of air, or other oxygen-containing gases, since oxygen when present in appreciable amount sometimes causes increased by-product formation and a lowering in the yield of isoleucine. Thus, in practice, air is swept from the reaction chamber with steam, nitrogen, or other inert gas prior to carrying out the hydrolysis.

Such hydrolysis under pressure of 5-(sec.-butyl) hydantoin with aqueous barium hydroxide occurs rapidly, e. g. when carried out at temperatures above 150° C. the reaction may be completed in less than one hour and, at 200° C., in less than five minutes. Peculiarly, at the atmospheric boiling point of the reaction mixture, barium hydroxide is not a satisfactory agent for the hydrolysis of 5-(sec.-butyl) hydantoin to form isoleucine, e. g. the reaction occurs very sluggishly under such conditions. The products formed by the hydrolysis under the preferred conditions just given comprise insoluble barium carbonate, ammonia, and a water-soluble barium salt of isoleucine.

If desired, the mixture may be filtered to remove the barium carbonate and the filtrate may be concentrated by evaporation to crystallize and isolate the barium salt of isoleucine. However, since barium salts are toxic, it is important for medicinal uses that the isoleucine be recovered in free form or as a substantially non-toxic salt thereof, e. g. a sodium salt.

For this reason, the crude hydrolysis liquor, prior to or after being filtered, is treated with an agent capable of precipitating substantially all of the barium as an insoluble salt, e. g. as barium sulphate or carbonate, and of either liberating free isoleucine or forming a relatively non-toxic salt of isoleucine. Examples of such precipitating agents are sulphuric acid, sodium sulphate, potassium sulphate, ammonium sulphate, ammonium acid sulphate, carbon dioxide, ammonium carbonate, ammonium bicarbonate, sodium carbonate, sodium bicarbonate, or potassium carbonate, etc.

Use of an alkali metal sulphate or carbonate results in precipitation of barium sulphate or carbonate, respectively, and formation of a corresponding water-soluble alkali metal salt of isoleucine. The precipitated barium salt may be removed, e. g. by filtration, and the liquor may be concentrated by evaporation to crystallize and recover the isoleucine alkali metal salt.

Use of sulphuric acid or carbon dioxide as the precipitating agent results in precipitation of a corresponding salt of barium, leaving free isoleucine dissolved in the liquor. Use of ammonium sulphate, ammonium acid sulphate, ammonium carbonate, or ammonium bicarbonate, as precipitating agents may be regarded as giving a similar result, since the ammonium salt of isoleucine which is formed by the treatment is readily dissociated to form free isoleucine and ammonia upon heating the treated liquor, e. g. during evaporation to concentrate the liquor.

The crude hydrolysis mixture is usually treated with carbon dioxide or an ammonium carbonate, preferably the latter, and the precipitated barium carbonate is removed by filtration. The filtrate is evaporated, preferably under vacuum to crystallize the isoleucine product. Such evaporation may be carried out stepwise so as to crystallize and collect successive crops of isoleucine or it may be carried out directly substantially to dryness so as to obtain the isoleucine as a residue. When the crystallization is carried out in stepwise manner, the first several fractions of isoleucine, representing a major portion of the product, are obtained directly in a form of high purity. The last few fractions of isoleucine obtained in such stepwise crystallization operation, or the isoleucine obtained as residue from a single step evaporation of the liquor to dryness sometimes is somewhat discolored or impure. We have found that it may readily be decolorized and purified by admixing the same with sufficient of a lower monohydric alcohol such as methyl, ethyl, propyl, or butyl alcohol, to form a slurry and filtering the slurry. A further amount of isoleucine can be crystallized from the alcohol used in thus washing the product.

The following examples describe certain ways in which the principle of the invention has been applied, but are not to be construed as limiting its scope.

*Example 1*

A solution of 21 grams (0.25 mole) of tiglic aldehyde and 110 cubic centimeters of ethyl alcohol of 95 per cent concentration was treated with 1.5 grams of charcoal having approximately 5 per cent by weight of finely divided palladium deposited thereon. The mixture was treated at room temperature with hydrogen at an initial pressure of 44 pounds per square inch gauge. After contact with the hydrogen for only 5 minutes, the amount of hydrogen theoretically required for conversion of the tiglic aldehyde to alpha-methyl-butyraldehyde was consumed. The pressure was then released. The mixture was filtered to remove the catalyst and the filtrate was added with stirring to a solution of 43 grams (0.377 mole) of ammonium carbonate monohydrate and 13.75 grams (0.28 mole) of sodium cyanide in 250 cubic centimeters of water. During mixing of these materials, the temperature rose spontaneously from 15° to 28° C. The mixture was heated under reflux at a temperature of 80° C. for 2 hours. Alcohol was then distilled under vacuum from the mixture. The remaining aqueous reaction mixture was treated while hot with 75 cubic centimeters of an aqueous hydrochloric acid solution of 37 per cent concentration, and the acidified mixture was cooled. The acidification was carried out in a hood vented so as to remove any hydrogen cyanide which might be evolved. Upon acidifying and cooling the mixture, 5-(sec.-butyl) hydantoin was precipitated. The precipitate was removed by filtration and washed with cold water. There was obtained 22.1 grams of substantially pure 5-(sec.-butyl) hydantoin. The mother liquor from which the 5-(sec.-butyl) hydantoin was precipitated was evaporated under vacuum to dryness and a further amount of 5-(sec.-butyl) hydantoin was extracted from the residue by heating the latter together with 100 cubic centimeters of acetone. The extract was filtered and acetone was distilled therefrom. The residual 5-(sec.-butyl) hydantoin was washed thoroughly with 50 cubic centimeters of cold water and dried. There was thus obtained an additional 7.2 grams of 5-(sec.-butyl) hydantoin. The total yield of 5-(sec.-butyl) hydantoin was 29.3 grams, or 75 per cent of theoretical.

*Example 2*

A mixture of 7.8 grams (0.05 mole) of 5-(sec.-butyl) hydantoin, 25.3 grams (0.08 mole) of barium hydroxide octahydrate, and 250 cubic centimeters of water was heated with agitation in an autoclave to a temperature of 200° C. After heating the mixture to 200° C., the autoclave was promptly cooled to about 80° C., opened, and the mixture was treated with an aqueous ammonium carbonate solution to precipitate the barium content thereof as barium carbonate. The barium carbonate was removed by filtration and the filtrate was evaporated to dryness by heating the same on a water bath at an absolute pressure of approximately 100 millimeters. The isoleucine which remained as a residue was digested with 100 cubic centimeters of hot ethyl alcohol and the alcohol was removed by filtration. There was obtained, as the residual product, 5.4 grams, or 81.3 per cent of the theoretical yield, of substantially pure isoleucine.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. A method which comprises admixing one molecular equivalent of alpha-methyl-butyraldehyde with an aqueous solution of at least one mole of an alkali metal cyanide and at least 1.5 moles of at least one water-soluble inorganic ammonium salt including at least one mole of ammonium carbonate, heating the mixture to a reaction temperature between 40° and 120° C., adding a strong mineral acid in amount sufficient to bring the mixture to a pH value of less than 4, cooling the mixture and separating the 5-(sec.-butyl) hydantoin which is precipitated.

2. A method, as described in claim 1, wherein the reaction mixture is acidified by adding hydrochloric acid thereto.

3. A method which comprises admixing one molecular equivalent of alpha-methyl-butyraldehyde with an aqueous solution of at least one mol of an alkali metal cyanide and at least 1.5 mols of water-soluble inorganic ammonium salts including at least one mol of ammonium carbonate together with an appreciable amount of another ammonium salt, heating the mixture to a temperature between 40° and 120° C., adding a strong mineral acid in amount sufficient to bring the mixture to a pH value less than 4, cooling the mixture, and separating the 5-(sec.-butyl) hydantoin which is precipitated.

JOHN E. LIVAK.
EDGAR C. BRITTON.

REFERENCES CITED

The following references are of record in the file of this patent:

UNITED STATES PATENTS

| Number | Name | Date |
|---|---|---|
| 2,040,130 | Halbig et al. | May 12, 1936 |
| 2,480,644 | Goldsmith et al. | Aug. 30, 1949 |

(Other references on following page)

FOREIGN PATENTS

| Number | Country | Date |
|---|---|---|
| 566,094 | Germany | Dec. 14, 1932 |

OTHER REFERENCES

Urech, "Liebigs Annalen," vol. 164, pp. 264–271 (1872).

Heintz, "Liebigs Annalen," vol. 169, pp. 125–127 (1873).

Pinner et al., "Ber. deut. Chem.," vol. 22, pp. 695, 696 (1889).

Bucherer et al., "J. Prak Chem.," vol. 141, page 25 (1934).

Bucherer et al., "J. Prak Chem.," vol. 140, pp. 291–316 (1934).

Boyd et al., "Biochem J.," vol. 29 (1935) page 553.

Houben "Die Methoden der Organischen Chemie," 3rd edition, 1941, vol. 4, p. 742.